United States Patent Office 3,686,167

Patented Aug. 22, 1972

3,686,167
BENZAZOCINE DERIVATIVES

Hajime Fujimura, Kyoto, Mikio Hori, Gifu, Toru Masuda, Nishinomiya, and Yoichi Sawa and Takeshi Kato, Osaka, Japan, assignors to Takeda Chemical Industries, Ltd., Osaka, Japan No Drawing. Filed Feb. 10, 1969, Ser. No. 798,148
Claims priority, application Japan, Feb. 9, 1968, 43/8,078; Feb. 29, 1968, 43/13,037; May 24, 1968, 43/35,120
Int. Cl. C07d *41/08, 99/04*
U.S. Cl. 260—239 BB 11 Claims

ABSTRACT OF THE DISCLOSURE

Benzazocine derivatives of the formula:

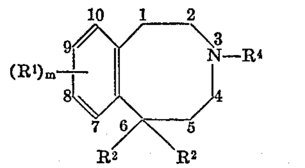

(I)

wherein $R^1$ represents methoxy, hydroxy, or an acyloxy group, with the proviso that two $R^1$ groups may together form an alkylenedioxy group, *m* is an integer of 1 to 3, each $R^2$ represents an alkyl group having at most 4 carbon atoms, and $R^4$ stands for hydrogen, an aliphatic or cycloaliphatic group having at most 6 carbon atoms, an aralkyl group having up to 10 carbon atoms, an alkylaminocarbonylalkyl or mono- or di-alkylaminoalkyl group wherein the alkyl has at most 3 carbon atoms, alkylcarbonyl of up to 5 carbon atoms, cyclopropylcarbonyl, benzoyl, phenylacetyl, tosyl or tetrahydrofurfuryl group, are non-narcotic analgesic compounds.

This invention relates to novel and useful benzazocine derivatives of the following general Formula I and a method for the production thereof.

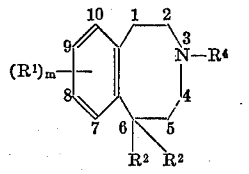

(I)

In Formula I, $R^1$ represents methoxy, hydroxy, or an acyloxy group, with the proviso that two $R^1$ groups may together form an alkylenedioxy group, *m* is an integer of 1 to 3, each $R^2$ represents an alkyl group having at most 4 carbon atoms, and $R^4$ stands for hydrogen, an aliphatic or cycloaliphatic group having at most 6 carbon atoms, an aralkyl group having up to 10 carbon atoms, an alkylamino, carbonylalkyl or mono- or di-alkylaminoalkyl group wherein the alkyl has at most 3 carbon atoms, acyl group having at most 4 carbon atoms or tetrahydrofurfuryl group.

In Formula I, $R^1$ may be attached at any optional position of the benzene ring. An acyloxy group represented by $R^1$ is, for example, alkanoyloxy or aryl monocarboxylic acid acyloxy, e.g. acetyloxy, benzoyloxy, etc.

An alkyl group represented by each $R^2$ may be the same or different and is exemplified by methyl, ethyl, propyl, iso-propyl, butyl, iso-butyl, sec-butyl, tert-butyl, etc. An alkylenedioxy group which may be formed by two $R^1$ groups is, for example, lower alkylenedioxy, e.g. methylenedioxy, ethylenedioxy, etc. An aliphatic or cycloaliphatic group represented by $R^4$ may be saturated, or unsaturated, such as lower alkyl, e.g. methyl, ethyl, propyl, iso-propyl, butyl, iso-butyl, sec-butyl, tert-butyl, amyl, lower alkenyl e.g. allyl dimethylallyl or lower cycloalkyl substituted alkyl, e.g. cyclopropylmethyl, etc. An alkylaminocarbonylalkyl group represented by $R^4$ is, for example, methylaminocarbonylmethyl, ethylaminocarbonylmethyl, propylaminocarbonylmethyl, iso-propylaminocarbonylmethyl, methylaminocarbonylethyl, ethylaminocarbonylethyl, propylaminocarbonylethyl, isopropylaminocarbonylethyl, methylaminocarbonylpropyl, ethylaminocarbonylpropyl, etc. Mono- or di-alkylaminoalkyl represented by $R^4$ is, for example, mono- or di-methylaminomethyl, mono- or di-ethylaminoethyl, mono- or di-ethylaminoethyl, N-methyl-N-ethylaminomethyl, N-methyl-N-ethylaminoethyl, etc. An aralkyl group represented by $R^4$ may be phenyl lower alkyl, e.g. benzyl, phenethyl, etc.

The compounds represented by the afore-described Formula I are useful, for example, as analgesic agents, antitussive agents, diuretic agents and hypotensors.

Among the hitherto-known analgesics, ones which are narcotic such as morphine and pethidine have been considered as being the most effective. However, these analgesics are, due to their narcotic property, bound up with the fatal defect that they tend to cause habituation on administration and thus a serious attention must be paid on their employment. Therefore, it has long been a desideratum to provide a highly effective non-narcotic analgesic.

The present compounds of the Formula I show a synergism with nalorphine and therefore are concluded as being non-narcotic. They show a synergism also against morphine and show effective analgesic activity higher than or nearly equal to hitherto-known narcotic analgesics such as pethidine and morphine. And, needless to say, analgesic activity of the present compounds is much higher than that of the known non-narcotic analgesics including pentazocine which has recently been developed.

Additionally, the compounds of Formula I may be, due to the above-mentioned characteristic features (i.e. showing a synergism against not only nalorphine but also morphine as well as showing a high analgesic activity), considered as unique analgesic agents of a quite different type from the known analgesics.

The principal object of the present invention is, thus, to provide novel benzazocine derivatives which are useful as unique, highly effective non-narcotic analgesics and also are useful as antitussive, diuretic and hypotensive agents.

Another object of the present invention is to provide processes for the production of the benzazocine derivatives (I).

The benzazocine derivatives of Formula I wherein $R^4$ is other than hydrogen are, as analgesics, more preferable than those wherein $R^4$ is hydrogen, while the latter compounds are useful also as intermediates for the production of the former compounds.

Among the N-substituted compounds (i.e. $R_4$ is other than hydrogen), those wherein $R_4$ is lower alkyl or lower aralkyl, particularly, methyl or benzyl group are preferably put into practice use.

The present compounds of Formula I are prepared by using one or more of the following processes:

(1) The benzazocine derivatives of Formula I are prepared by reacting a phenylalkylamine derivative of the Formula II

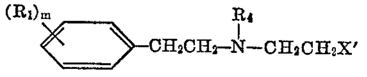

(II)

(wherein $R^1$, $R^4$ and *m* have the same meaning as defined above, and X′ represents a radical $$-\underset{\underset{O}{\|}}{C}-R_2,\ R_2$$

having the same meaning as above, or a functional group derived from a carboxylic group such as carboxylic halides, carboxylic esters, carboxylic anhydrides, etc.) with a Grignard's reagent of the formula $$R^2MgX \qquad (III)$$

(wherein $R^2$ has the same meaning as defined above, and X stands for halogen) whereby the corresponding phenylalkylaminoalcohol derivative is produced, and then subjecting the resulting phenylalkylaminoalcohol derivative to a ring-closure reaction. The reaction may be shown by the following equations.

(A)

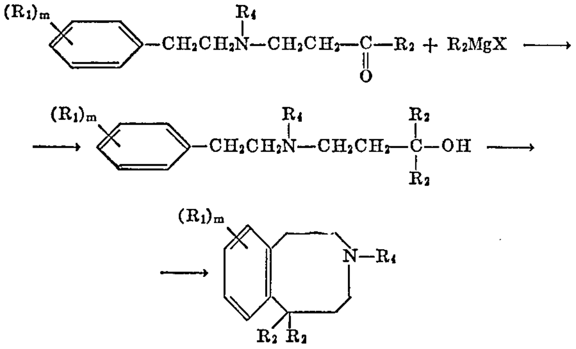

(B)

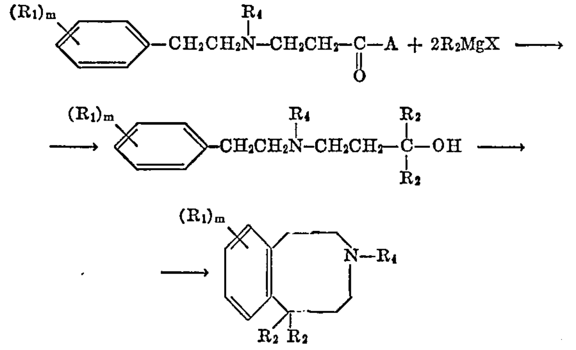

(wherein —C(=O)—A is a functional group derived from a carboxylic group

Thus, it is apparent that when a compound of the Formula I wherein the two $R^2$ groups at 6-position are different from each other is desired, a compound of the Formula II wherein X' is $$—\underset{\underset{O}{\parallel}}{C}—R_2$$

is used as a starting material.

(2) Benzazocine derivatives of the Formula I'

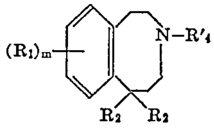

(I)'

(wherein $R_1$, $R_2$ and *m* have the same meaning as above and $R'_4$ is the same as $R_4$ with the exception where $R_4$ is hydrogen) are prepared by introducing the $R'_4$ group into the nitrogen atom of the benzazocine derivative of the Formula IV

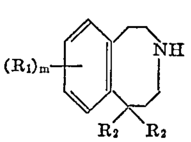

(IV)

(wherein $R_1$, $R_2$ and *m* have the same meaning as defined above).

(3) The compounds of the Formula IV are prepared by subjecting the benzazocine derivative (I') to a reaction to remove the radical $R_4$.

(4) In a case where one or more of the group $R_1$ groups attached to the benzene ring of the Formula I are alkoxy or acyl, the group may be converted to OH group.

(5) In a case where one or more of the group attached to the benzene ring of the Formula I are hydroxy, the groups may be converted to methoxy or acyloxy group in a per se conventional manner.

The above summarized processes of the present invention are further explained in the following:

The compounds of the Formula I can be produced by the process (1).

In the above Formula II X' stands for a radical $$—\underset{\underset{O}{\parallel}}{C}—R_2$$

or a functional group derived from a carboxylic group such as carboxylic halides (e.g. —COCl, —COBr, etc.), carboxylic esters (e.g. —COOR', R' being alkyl such as methyl, ethyl, propyl, butyl, etc. and aralkyl such as benzyl, phenethyl, etc.) and carboxylic anhydrides (e.g.

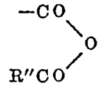

where R''COOH is a carboxylic acid).

The phenylalkylamine derivative II to be employed as a starting material in the method of the present invention may be prepared, for example, by a process which comprises reacting the compound of the formula

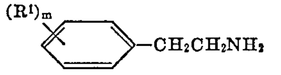

(wherein $R^1$ and *m* have the same meaning as defined above) with an acyl halide of the Formula RCOX (wherein X stands for halogen such as chlorine, bromine, etc., and R is defined below), whereby the compound of the formula

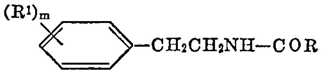

(wherein $R^1$ and *m* have the same meaning as above, and the radical RCO corresponds to the acyl group represented by $R^4$) is produced, optionally reducing the carbonyl group attached to a radical R to —$CH_2$— group, whereby a compound of the formula

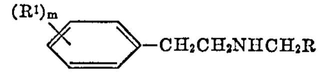

(wherein $R^1$ and *m* have the same meaning as above, and the radical $RCH_2$ corresponds to such alkyl, aralkyl, alkylaminocarbonylalkyl, mono- or di-alkylaminoalkyl, or tetrahydrofurfuryl group as defined by $R^4$) is produced, and finally reacting thus produced with an acrylic acid derivative of the formula $$CH_2{=}CH—COX'$$

(wherein X' has the same meaning as above).

In the first step of the process in the present method, the phenylalkylamine derivative (II) is reacted with a Grignard's reagent (III) to produce the corresponding phenylalkylaminoalcohol derivative. This reaction is carried out according as the conventional Grignard's reaction, for example, by mixing the phenylalkylamine derivative (II) and the Grignard's reagent (III) in the presence of an inert solvent under anhydrous condition. The inert solvent to be employed in the process is, for example, diethylether, di-iso-propylether, di-iso-butylether, dibutylether, tetrahydrofuran, a mixture of diethylether and benzene. The reaction temperature generally ranges from about 0° C. to about 150° C. and preferably about 30° C. to about 100° C.

When the compound of the Formula II wherein X' is $$-\underset{\underset{O}{\|}}{C}-R_2$$

is used as a starting material, one mole of the Grignard's reagent reacts with one mole of the compound (II). On the other hand, when the compound (II) wherein X' is a functional group derived from a carboxylic group is used, two moles of the Grignard's reagent reacts with one mole of the compound (II).

Thus produced phenylalkylaminoalcohol derivative is brought into the subsequent ring closure reaction without isolation from the reaction mixture or with isolation therefrom in an optional purity. The isolation of the phenylalkylaminoalcohol derivative can be carried out, for example, by decomposing the reaction mixture with addition of water and ammonium chloride, separating the organic layer and removing the solvent.

The ring closure reaction of the present invention is carried out in the presence of a dehydrating agent. The dehydrating agent is, for example, hydrogenfluoride, boron trifluoride, arsenic trifluoride, phosphorus pentafluoride, titanium tetrafluoride, concentrated sulfuric acid, polyphosphoric acid and polyphosphoric ester, and among these polyphosphoric acid is most practical. The dehydrating agent is preferably employed in excess relative to the phenylalkylaminoalcohol derivative. The ring closure reaction generally proceeds at a temperature of about 60° C. to about 150° C. for about several minutes or more. Thus produced benzazocine compound can be isolated from the reaction mixture by per se conventional manner. For example, the benzazocine derivative can be isolated by pouring the resultant into ice-water, neutralizing the resulting suspension and isolating the water-soluble substance.

In the ring closure reaction, when a volatile dehydrating agent such as hydrogenfluoride etc. is employed it is preferable to conduct the reaction under elevated pressure or at a low temperature.

The benzabocine derivative (I') of the present invention can be prepared also by the afore-mentioned process (2), i.e. by introducing $R^{4'}$ group into the nitrogen of the benzazocine derivative (IV). The introduction of $R^{4'}$ group is generally carried out by reacting the benzazocine derivative (IV) with the corresponding halogenide of the formula $R^{4'}X$ wherein $R^{4'}$ has the same meaning as defined above and X stands for halogen. The halogenide represented by the above formula is, for example, alkylhalogenides (e.g. methyl chloride, methyl bromide, methyl iodide, ethyl bromide, iso-propyl bromide, propyl bromide, butyl chloride, butyl bromide, vinyl chloride, propargyl bromide, allyl bromide, dimethylalkyl bromide, 2-butenyl chloride, 3-methyl-2-butenyl chloride, etc.), aralkyl halogenides (e.g. benzyl chloride, benzyl bromide, phenylethyl chloride, etc.), acyl halides (e.g. acetyl chloride, propionyl chloride, cyclopropylcarbonyl chloride, butyryl chloride, valeryl chloride, benzoyl chloride, phenyl acetyl chloride, tosyl chloride, etc.), alkylaminocarbonylalkyl halides, mono- or di-alkylaminoalkyl halides and tetrahydrofurfuryl halides.

The introduction of $R^{4'}$ group is also carried out by the use of dialkyl sulfates (e.g. dimethyl sulfate, diethyl sulfate, etc.), dialkyl sulfites (e.g. dimethyl sulfite, diethyl sulfite, etc.), carboxylic acid or anhydrides (e.g. acetic acid, propionic acid, acetic anhydride, propionic anhydride, etc.). The above reatcion for introducing $R^{4'}$ group is generally carried out in the presence of a solvent suitably selected from water, methanol, ethanol, iso-propanol, butanol, tetrahydrofuran, dioxane, ether, petroleum ether, chloroform, benzene, toluene, xylene, dimethylformamide, pyridine, aldehydechloridine, dimethylsulfoxide and a mixture thereof with the range from a room temperature to a refluxing temperature of the solvent used.

When the above mentioned halogenide is employed in the introduction reaction, it is preferable to use a deacidifying agent such as sodium hydrogen carbonate, potassium hydrogen carbonate, sodium hydroxide, potassium hydroxide, sodium amide, sodium hydride, metallic sodium, metallic potassium, metallic lithium, organic bases (e.g. pyridine, aldehydecholidine, dimethylaniline, triethylamine, etc.). However, excess of the benzazocine derivative of the starting material can be used as the deacidifying agent. The benzazocine derivative (I') may also be prepared by allowing other conventional alkylating or aralkylating agents to act upon the benzazocine derivative (IV). For example, a diazoalkane (e.g. diazomethane, etc.), an aldehyde combined with a reducing agent (e.g. formaldehyde-formic acid, etc.) may be used for this purpose. Reaction conditions to be employed may be any of conventional ones. In other words, the benzazocine derivative (I') wherein $R^{4'}$ is an alkyl or aralkyl group can be prepared by allowing any of conventional alkylating or aralkylating agents to act upon the benzazocine derivative (IV).

The benzazocine derivative of the Formula IV can also be produced by the afore-mentioned process (3), i.e. by subjecting the benzazocine derivative of the formula I' to a removal-reaction of the $R^{4'}$ group. The removal reaction is carried out by, at first, reacting the benzazocine derivative (I') with phosgene or an ester of chlorocarbonic acid, and then subjecting the resultant product to hydrolysis or destructive hydrogenation. The ester of chlorocarbonic acid to be employed in the removal reaction is, for example, methyl-, ethyl-, propyl-, t-butyl- or benzyl chlorocarbonate. The reaction of the benzazocine derivative (I') with phosgene or an ester of chlorocarbonic acid is generally carried out in the presence of inert solvent such as benzene, toluene, diethyl ether, di-iso-propyl ether or tetrahydrofuran at a temperature of about 15 to about 110° C. Phosgene or an ester of chlorocarbonic acid is used in an equimolar or slightly excess amount to the compound (I'). The resultant product is, after separation and purification or without separation, subjected to the subsequent hydrolysis or destructive hydrogenation. The hydrolysis of the resultant is generally carried out by treating the same with an alkali (e.g. sodium hydroxide, potassium hydroxide, barium hydroxide, etc.) in the presence of a solvent (e.g. ethyleneglycol, diethyleneglycol, ethyleneglycol momomethylether, butanol, etc.) at a temperature of about 150° C. to about 200° C., or with a mineral acid (e.g. hydrochloric acid, sulfuric acid, etc.) under heating. The destructive hydrogenation of the resultant product produced by the reaction of the benzazocine derivative (I') with phosgene or an ester of chlorocarbonic acid is generally carried out by allowing hydrogen to act upon the resultant product under the presence of a hydrogenation catalyst (e.g. palladium carbon, platinum oxide, etc.), or under the presence of an organic solvent such as a lower alkanol (e.g. methanol, ethanol, propanol, etc.). The destructive hydrogenation is conducted by using a catalyst such as palladium carbon and platinum oxide in the presence of a solvent (e.g. methanol, ethanol, acetic acid, water, etc.) under pressure of 1 to 50 atoms. In the above reaction, when benzyl chlorocarbonate is reacted with the benzoazocine derivative (I'), it is preferable to subject the intermediate to the destructive hydrogenation rather than hydrolysis.

When $R'^4$ is an alkyl group, the removal of the alkyl group $R'^4$ may be effected by reacting the benzazocine derivative (I') wherein $R'^4$ is an alkyl group with a halogenocyanide (e.g. bromocyanide, chlorocyanide, etc.) to substitute the cyano group for the alkyl group and then subjecting the resultant product to a conventional reaction for removing the cyano group.

The reaction of the benzazocine derivative (I') wherein $R'^4$ is an alkyl group with a halogenocyanide is generally carried out in the presence or absence of a solvent (e.g. chloroform, etc.) under heating, whereby the alkyl group is replaced by cyano group. Thus produced intermediate is, for the purpose of the removing cyano group, treated with an acid (e.g. hydrochloric acid, hydrobromic acid, etc.) or an alkali (e.g. sodium hydroxide, potassium hydroxide, etc.) under heating, or subjected to a conventional mild hydrogenation with use of, for example, a hydride (e.g. lithium aluminum hydride, etc.) or alkali metal or alkaline earth metal in liquid ammonia.

When $R'^4$ is an aralkyl group, the removal of the aralkyl group $R'^4$ may be effected by hydrogenating the benzazocine derivative (I') wherein $R'^4$ is an aralkyl group. The hydrogenation is preferably carried out by allowing hydrogen to act upon the compound by employing a conventional hydrogenation catalyst (e.g. palladium carbon, platinum oxide, etc.) under pressure of about 1 to about 50 atmospheres, in the presence of a solvent (e.g. water, methanol, ethanol, acetic acid, etc.) at a room temperature or an elevated one.

When $R'^4$ is an acyl group, the removal of the acyl group may be effected by hydrolysis of the benzazocine derivative (I') wherein $R'^4$ is an acyl group with an acid (e.g. hydrochloric acid, hydrogen bromide, sulfuric acid, etc.), or an alkali (e.g. sodium hydroxide, potassium hydroxide, sodium carbonate, potassium carbonate, etc.) in the presence or absence of a suitable solvent at room temperature or an elevated one.

In the present invention, the N-substituted benzazocine derivative, i.e. the compound of the Formula I', can be produced by the afore-mentioned process (1), and thus produced benzazocine derivative (I') can be converted into the N-unsubstituted benzazocine derivative, i.e. the compound of the Formula IV, by the afore-mentioned process (3), and it is also possible to convert the N-unsubstituted benzazocine derivative to the N-substituted one by the process (2). The N-unsubstituted compound can also be prepared directly by the process (1). The compound of the Formula I' wherein $R'^4$ is the same as above except a case of $R'^4$ being benzyl is particularly conveniently prepared by using series of steps consisting of (a) preparing the compound of the Formula I wherein $R^4$ is benzyl by the process (1), (b) converting thus prepared compound to the compound of the Formula IV by the process (3) and (c) finally introducing the desired $R'^4$ group into the N-position of thus converted product by the process (2).

Additionally, when $R^1$ of the product is methoxy or an acyloxy group, such groups may be converted into hydroxyl groups. The conversion of methoxy group to hydroxy group is generally carried out by the use of an acidic catalyst such as hydrogen bromide, hydrogen iodide, aluminium chloride and aluminium bromide, or by reductive cleavage by the use of an alkali metal (e.g. metallic sodium, potassium, lithium, etc.) in liquid ammonia. The conversion of the acyloxy group to hydroxyl group is generally carried out by the use of an acid (e.g. hydrochloric acid, hydrogen bromide, sulfuric acid, etc.) or an alkali (e.g. sodium hydroxide, potassium hydroxide, sodium carbonate, potassium carbonate, etc.).

On the other hand, when $R^1$ of the product is hydroxyl group, the hydroxyl group may be etherified to a methoxy group or esterified to an acyl group, by a conventional manner.

The etherification is carried out, for example, by treating the benzazocine derivative with dimethyl sulfate, methyl halides (e.g. methyl iodide, methyl bromide, etc.) or diazomethane.

The esterification is carried out by, for example, treating the benzazocine derivative with an esterifying agent such as acyl halides (e.g. acetylchloride, propionylchloride, benzoylchloride, etc.), and acid anhydrides (e.g. acetic anhydride, propionic anhydride, benzoyl anhydride, etc.).

Further, when the benzazocine derivative (I) of the present invention has a reducible $R^4$ group such as carbonyl group, the reducible $R^4$ group may be reduced by a conventional manner, for example, by catalytic reduction employing a catalyst such as nickel, palladium or copper-chromium oxide, etc., by active hydrogen produced by the reaction of a metal (e.g. sodium, sodium amalgan, aluminum amalgan, zinc, iron, tin, etc.) with an acid, water, an alcohol or an alkali, by metallic hydrides such as lithium aluminum hydride, diethylaluminum hydride and sodium borohydride, or by electrolytic reduction.

As the object benzazocine derivatives (I) have each a nitrogen atom in its molecule, it can form an acid addition salt with an acid such as an inorganic acid (e.g. hydrochloric acid, hydrogen bromide, hydrogen iodide, sulfuric acid, phosphoric acid, nitric acid, carbonic acid, thiocyanic acid, hydrogenperchloric acid, etc.), or an organic carboxylic acid (e.g. formic acid, acetic acid, propionic acid, glycolic acid, malonic acid, succinic acid, maleic acid, fumaric acid, hydroxyfumaric acid, malic acid, oxalic acid, tartaric acid, lactic acid, citric acid, salicyclic acid, cinnamic acid, diamino salicyclic acid, 2-phenoxybenzoic acid, 2-acetoxybenzoic acid, nicotinic acid, isonicotinic acid, caproic acid, palmitic acid, tannic acid, etc.), an organic sulfonic acid (e.g. methanesulfonic acid, 2-hydroxyethanesulfonic acid, ethane-1,2-disulfonic acid, benzensulfonic acid, p-toluenesulfonic acid, naphthalene-2-sulfonic acid, laurylsulfonic acid, etc.) and an organic phosphoric acid (e.g. cytidylic acid, guanylic acid and inosinic acid, etc.).

The pharmacological properties of the typical compounds falling within the Formula I are illustrated in the following:

In the following tables, the symbols "A" to "E" mean the following compounds;

(A) 3-dimethylallyl-6,6-dimethyl-8,9-dimethoxy-1,2,3,4,5,6-hexahydro-3-benzazocine hydrochloride
(B) 3,6,6-trimethyl-8,9-dimethoxy-1,2,3,4,5,6-hexahydro-3-benzazocine hydrochloride
(C) 3-cyclopropylmethyl-6,6-dimethyl-8,9-dimethoxy-1,2,3,4,5,6-hexahydro-3-benzazocine hydrochloride
(D) 3-benzyl-6,6-dimethyl-8,9-dimethoxy-1,2,3,4,5,6-hexahydro-3-benzazocine hydrochloride
(E) 3-benzyl-9-hydroxy-6,6-dimethyl-8-methoxy-1,2,3,4,5,6-hexahydro-3-benzazocine hydrochloride (I) Acute toxicity:

$LD_{50}$ is calculated by employing di-strain mice weighing about 15 to 20 grams and the results are listed in the following Table 1.

TABLE 1

| Compound | $LD_{50}$ mg./kg. by subcutaneous administration |
|---|---|
| B | 245 |
| D | >500 |
| Pentazocine lactate | 325 |
| Pethidine | 225 |

(II) Analgesic effect:

Analgesic effect is observed by the acetic acid stretching method employing mice, and $ED_{50}$ calculated is listed in the following Table 2.

TABLE 2

| | $ED_{50}$ mg./kg. by subcutaneous administration (by acetic acid stretching method) |
|---|---|
| A | 0.94 |
| B | 0.36 |
| C | 0.68 |
| D | 0.88 |
| E | 0.5 |
| Pentazocine lactate | 1.95 |
| Pethidine | 3.65 |

Owing to the low toxicity and strong effect as non-narcotic analgesics, the benzazocine derivative (I) of the present invention and its pharmaceutically acceptable salts can be administered safely per se as analgesic medicines or in the form of a pharmaceutically acceptable composition in admixture with a suitable and conventional carrier or adjuvant, administrable orally or by way of injection, without giving harm to the host. The pharmaceutical composition can take the form of tablets, granules, powders, capsules or injections and can be administered orally or subcutaneously or intramuscularly. Usual daily doses of the benzazocine derivatives (I) or salts thereof lie in the range of about 5 to about 100, preferably about 10 to about 60 milligrams per human adult.

For further explanation of the present invention, the following examples are given, wherein the word "part(s)" is based on weight unless otherwise noted, and the relation between "part by weight" and "part by volume" corresponds to that between gram and milliliter.

Example 1

To a solution of 2.6 parts of 3,6,6-trimethyl-8,9-dimethoxy-1,2,3,4,5,6-hexahydro-3-benzazocine in 15 parts by volume of benzene is dropwise added 1.1 part of ethyl chlorocarbonate in 5 parts by volume of benzene under nitrogen gas streams, whereby the reaction proceeds with a slight evolution of heat, followed by heating under reflux for 3.5 hours to complete the reaction. The reaction mixture is cooled to room temperature and subjected to filtration to remove insolubles. The filtrate is washed with 2 N hydrochloric acid, then with water, and dried over magnesium sulfate. The dried filtrate is concentrated and distilled under reduced pressure to give 2.1 parts of 3-ethoxycarbonyl-6,6-dimethyl - 8,9 - dimethoxy - 1,2,3,4,5,6-hexahydro-3-benzazocine as oily substance boiling at 200 to 204° C./4 mm. Hg. 2.5 parts of the oily substance is admixed with 5.5 parts of sodium hydroxide and 15 parts by volume of ethyleneglycol monoethylether, and heated at 180° C. to 190° C. for about 6 hours. The resulting mixture is cooled to room temperature, followed by the addition of about 70 parts by volume of water. This mixture is subjected to extraction with ether and the ether extract is further extracted with excessive amount of 2 N hydrochloric acid. The hydrochloric acid layer is alkalized by the addition of a concentrated aqueous ammonium solution, followed by subjecting to extraction with ether. The ether extract is washed with water, dried over potassium carbonate and concentrated to give 1.3 parts of 6,6-dimethyl-8,9-dimethoxy-1,2,3,4,5,6-hexahydro-3-benzazocine as oily substance. The oily substance is dissolved in 10 parts by volume of 15% ethanolic hydrochloric acid, and this solution is concentrated. The concentrate is recrystallized from a mixture of methanol and ethyl acetate to give colorless crystals of the hydrochloride melting at 212 to 213° C.

*Elementary analysis.*—Calculated for $C_{15}H_{21}NO_2.HCl$ (percent): C, 63.03; H, 8.46; N, 4.90. Found (percent): C, 62.83; H, 8.45; N, 4.96.

Example 2

To 2.9 parts of 3,6,6-trimethyl-8,9-dimethoxy-1,2,3,4,5,6-hexahydro-3-benzazocine in 20 parts by volume of benzene is introduced phosgene with agitation at a constant temperature of 50° C. for 3 hours. The resultant is cooled to room temperature and subjected to filtration. The filtrate is washed with cold 2 N hydrochloric acid and then with water, dried over magnesium sulfate, and concentrated to give 1.4 parts of 3-chlorocarbonyl-6,6-dimethyl-8,9-dimethoxy-1,2,3,4,5,6-hexahydro - 3 - benzazocine.

A mixture of 3.3 parts of the above obtained product, 4.0 parts of potassium hydroxide and 20 parts by volume of ethyleneglycol monoethylether is heated at about 160° C. for 3 hours. The mixture is cooled to room temperature, diluted with about 80 parts by volume of water, and extracted with ether. The ether layer is extracted with excessive amount of 2 N hydrochloric acid. The hydrochloric acid layer is alkalized by the concentrated aqueous ammonia solution and extracted with ether. The ether layer is washed with water, dried over potassium carbonate and concentrated to give 0.9 part of 6,6-dimethyl-8,9-dimethoxy-1,2,3,4,5,6-hexahydro - 3 - benzazocine as oily substance. The oily substance is converted into its hydrochloride of colorless crystals melting at 212 to 213° C. in a similar manner to that in Example 1.

Example 3

15 parts by volume of anhydrous benzene solution containing 2.6 parts of 3,6,6-trimethyl-8,9-dimethoxy 1,2,3,4,5,6-hexahydro-3-benzazocine is added to a solution of 3.0 parts of benzyl chlorocarbonate in 10 parts by volume of anhydrous benzene, followed by heating at 60° C. for 6 hours. The resultant is cooled to room temperature and subjected to filtration. The filtrate is washed with cold 2 N hydrochloric acid and then with water, dried over potassium carbonate and concentrated to give 3-benzyloxycarbonyl-6,6-dimethyl-8,9 - dimethoxy - 1,2,3,-4,5,6-hexahydro-3-benzazocine as an oily substance.

One part of this substance is dissolved into a mixture of 20 parts by volume of methanol and 0.5 part by volume of glacial acetic acid, followed by addition of one part of palladium carbon (palladium content of 5%). Into this mixture is continuously introduced hydrogen gas with agitation until evolution of carbon dioxide ceases. The resulting mixture is subjected to filtration to remove the palladium carbon, followed by distillation under reduced pressure to evaporate the solvent. This procedure gives 1.7 parts of 6,6-dimethyl-8,9-dimethoxy-1,2,3,4,5,6-hexahydro-3-benzazocine as an oily substance. The oily substance is converted into its hydrochloride melting at 212 to 213° C. in a similar manner to that in Example 1.

Example 4

To 4.6 parts of 3-benzyl-6,6-dimethyl-8,9-dimethoxy-1,2,3,4,5,6-hexahydro-3-benzazocine prepared according to the method in Example 19-(2) dissolved in 20 parts by volume of benzene is added slowly a solution of 1.8 parts of ethyl chlorocarbonate in 5 parts by volume of benzene. The mixture is refluxed for 18 hours, and the resulting mixture is subjected to steam distillation. The residue is extracted with ether. The extract is washed with 2 N hydrochloric acid and then with water, dried over magnesium sulfate and concentrated to give 4.7 parts of 3-ethoxy-carbonyl-6,6-dimethyl - 8,9 - dimethoxy-1,2,3,4,5,6-hexahydro-3-benzazocine.

1.6 part of this product is refluxed with 3.2 parts of barium hydroxide having 8 moles of water of crystal and 25 parts by volume of ethyleneglycol for 18 hours. The resulting mixture is poured into ice-water, and the whole mixture is subjected to extraction with ether. The extract is washed with water, dried over magnesium sulfate and concentrated to give 1.1 part of 6,6-dimethyl-8,9-dimethoxy-1,2,3,4,5,6-hexahydro-3-benzazocine. This product is converted into its hydrochloride melting at 212 to 213° C. in a similar manner to that in Example 1.

Alternatively, the 6,6-dimethyl-8,9-dimethoxy-1,2,3,4,5,6-hexahydro-3-benzazocine can be produced by the following steps starting with 3-ethoxycarbonyl-6,6-dimethyl-8,9-dimethoxy-1,2,3,4,5,6-hexahydro - 3 - benzazocine. Namely, 2 parts of the starting material is refluxed in 20 parts by volume of concentrated hydrochloric acid for 20 hours, and then concentrated under reduced pressure. The residue is dissolved in a small amount of water. The aqueous solution is made to alkaline by the addition of 10% aqueous sodium hydroxide solution, followed by extraction with ether. The extract is dried over magnesium sulfate and concentrated to give 0.7 part of the object 6,6-dimethyl-8,9-dimethoxy-1,2,3,4,5,6-hexahydro - 3 - benzazocine.

Example 5

1.9 part of 3,6,6-trimethyl - 8,9 - dimethyl-1,2,3,4,5,6-hexahydro-3-benzazocine is dissolved in 10 parts by volume of chloroform. To the solution is added dropwise a solution of 0.95 part of bromocyanide in 10 parts by volume of chloroform over about 15 minutes. This mixture is refluxed for 2 hours and the chloroform is distilled out. The residue is dissolved in ether and washed with water. After drying, the ether is distilled out from the ether solution to give 1.5 part of 3-cyano-6,6-dimethyl-8,9 - dimethoxy-1,2,3,4,5,6-hexahydro - 3 - benzazocine. 0.9 part of the product is refluxed with 20 parts by volume of a 10% hydrochloric acid for 10 hours. The resultant is made to alkaline by the addition of aqueous solution of sodium hydroxide, followed by extraction with ether. The extract is washed with water, dried over magnesium sulfate, and distilled to evaporate ether to give 0.6 part of 6,6-dimethyl-8,9-dimethoxy-1,2,3,4,5,6-hexahydro-3-benzazocine as an oily substance. The oily substance is converted into its hydrochloride of colorless crystals melting at 212 to 213° C. in a similar manner to that in Example 1.

Example 6

1.0 part of 3-benzyl-6,6-dimethyl-8,9-dimethoxy-1,2,3,4,5,6-hexahydro-3-benzazocine is dissolved in 15 parts by volume of methanol. To the solution is added 1.2 part of 5% palladium carbon containing 50% water.

To the mixture is introduced hydrogen gas at 20° C. under atmospheric pressure. After the adsorption of the hydrogen gas is completed, the mixture is filtered. The filtrate is concentrated, followed by the addition of 10% ethanolic hydrochloric acid. This solution is concentrated and the concentrate is recrystallized from a mixture of methanol and ethyl acetate to give 0.70 part of crystal of 6,6-dimethyl-8,9-dimethoxy - 1,2,3,4,5,6 - hexahydro-3-benzazocine hydrochloride melting at 212 to 213° C.

*Elementary analysis.*—Calculated for $C_{15}H_{21}NO_2 \cdot HCl$ (percent): C, 63.03; H, 8.46; N, 4.82. Found (percent): C, 63.11; H, 8.59; N, 4.82.

Example 7

1.0 part of 3-benzyl-6,6-dimethyl-8-methoxy-1,2,3,4,5,6-hexahydro-3-benzazocine is dissolved in 15 parts by volume of methanol, followed by the addition of 1.2 part of 5% palladium carbon containing 50% of water (the same commercial product as that employed in Example 6). The mixture is treated in a similar manner to that in Example 6 to give 0.67 part of colorless crystals of 6,6-dimethyl-8-methoxy-1,3,3,4,5,6-hexahydro - 3 - benzazocine hydrochloride melting at 242 to 244° C.

*Elementary analysis.*—Calculated for $C_{14}H_{22}NO \cdot HCl$ (percent): C, 65.73; H, 8.67; N, 5.47. Found (percent): C, 65.60; H, 8.57; N, 5.36

Example 8

1.0 part of 3-acetyl-6,6-dimethyl-8,9-dimethoxy-1,2,3,4,5,6-hexahydro-3-benzazocine is dissolved in 20 parts by volume of 2% alcoholic sodium hydroxide. The solution is refluxed for 3 hours. The resulting solution is concentrated, followed by the extraction with ether. The extract is washed with water, dried and concentrated to give 0.6 part of 6,6-dimethyl-8,9-dimethoxy-1,2,3,4,5,6-hexahydro-3-benzazocine as an oily substance. The oily substance is converted into its hydrochloride of colorless crystals melting at 212 to 213° C. in a similar manner to that of Example 1.

*Elementary analysis.*—Calculated for $C_{15}H_{21}NO_2 \cdot HCl$ (percent): C, 63.03; H, 8.46; N, 4.90. Found (percent): C, 63.29; H, 8.28; N, 4.93.

Example 9

A mixture of 2.0 parts of 6,6-dimethyl-8,9-dimethoxy-1,2,3,4,5,6-hexahydro-3-benzazocine, 2.0 parts of phenethylbromide and 60 parts of sodium bicarbonate is refluxed in 150 parts by volume of dimethylformamide for 5 hours. The resulting reaction mixture is filtered. The filtrate is washed with ethanol and distilled under vacuum to evaporate the organic solvent. To the resulting residue is added ether, and the mixture is filtered to remove insolubles. The ether layer is extracted with dilute hydrochloric acid. The hydrochloric acid extract is made alkaline by the addition of a diluted aqueous ammonia solution, followed by the extraction of ether. The extract is dried with potassium carbonate and distilled to evaporate the solvent. The resulting residue is dissolved in a mixture of methanol and ethyl acetate. This solution is passed through a column packed with silica gel to remove impurities. The resulting eluate is distilled to evaporate the solvent, whereby 3-phenethyl-6,6-dimethyl-8,9-dimethoxy-1,2,3,4,5,6-hexahydro-3-benzazocine is yielded as an oily product. Hydrochloride of this product is crystallized from a mixture of methanol and ethyl acetate to give colorless crystals melting at 197° C. to 198.5° C.

*Elementary analysis.*—Calculated for $C_{23}H_{31}NO_2 \cdot HCl$ (percent): C, 70.84; H, 8.27; N, 3.59. Found (percent): C, 70.88; H, 8.10; N, 3.60.

Example 10

(1) A mixture of 3.5 parts of 6,6-dimethyl-8,9-dimethoxy-1,2,3,4,5,6-hexahydro - 3 - benzazocine and 7.5 parts of potassium carbonate is dissolved in a mixture of 25 parts by volume of water and 75 parts by volume of methanol, followed by the addition of 5 parts of phenylacetyl chloride. One hour after the addition 300 parts by volume of water is added to the resulting mixture, followed by the extraction with ether. The extract is further extracted with diluted hydrochloric acid to remove impurities. The ether layer is washed with an aqueous solution of sodium carbonate and then with water, and dried over magnesium sulfate. This ether solution is subjected to distillation to evaporate the solvent, whereby 3-phenylacetyl-6,6-dimethyl - 8,9 - dimethoxy-1,2,3,4,5,6-hexahydro-3-benzazocine is yielded. This product shows a maximum IR absorption at 1690 cm.$^{-1}$ significant for an acid amide linkage.

*Elementary analysis.*—Calculated for $C_{23}H_{29}NO_3$ (percent): C, 75.17; H, 7.96; N, 3.81. Found (percent): C, 75.46; H, 7.75; N, 3.99.

(2) 2.0 parts of 3-phenylacetyl - 6,6 - dimethyl-8,9-dimethoxy - 1,2,3,4,5,6 - hexahydro - 3 - benzazocine dissolved in 5 parts by volume of tetrahydrofuran is dropwise added to 1.5 parts of lithium aluminum hydride suspended in 20 parts by volume of tetrahydrofuran. The mixture is refluxed for 20 hours. After cooling, the resultant is supplied with ethyl acetate in an excess amount to the lithium aluminum hydride, followed by addition of saturated ammonium sulfate solution. The resulting tetrahydrofuran layer is removed. The resultant aqueous layer is extracted twice with dichloromethane. The dichloromethane extracts are combined and dried over magnesium sulfate. The dichloromethane solution is distilled to evaporate the solvent to give the obejct 3-phenethyl - 6,6 - dimethyl - 8,9 - dimethoxy - 1,2,3,4,5,6 - hexahydro-3-benzazocine as an oily product. The product is converted into the hydrochloride by use of hydrochloric acid. The hydrochloride is recrystallized from a mixture of methanol and ethyl acetate to give colorless crystals melting at 197° C. to 198° C.

*Elementary analysis.*—Calculated for $C_{23}H_{31}NO_2 \cdot HCl$ (percent): C, 70.84; H, 8.27; N, 3.59. Found (percent): C, 70.65; H, 8.19; N, 3.62.

Example 11

A mixture of 2.0 parts of 6,6-dimethyl-8,9-dimethoxy-1,2,3,4,5,6 - hexahydro - 3 - benzazocine, 20 parts by volume of formic acid and 8 parts by volume of Formalin is refluxed on an oil bath for 8 hours. After cooling, the reaction mixture is made acidic by the addition of diluted hydrochloric acid and distilled under reduced pressure to evaporate the solvent. To the resulting residue are added water and ether and this mixture is agitated. The aqueous layer is taken and is made alkaline by the addition of aqueous ammonia solution, followed by the extraction with ether. The ether layer is washed with water, dried with potassium carbonate and distilled to evaporate the solvent to give 3,6,6 - trimethyl - 8,9 - dimethoxy-1,2,3,4,5,6-hexahydro-3-benzazocine as an oily product.

Hydrochloride of this product is recrystallized from a mixture of methanol and ethyl acetate to give colorless crystals melting at 215° C. to 216° C.

*Elementary analysis.*—Calculated for $C_{16}H_{25}NO_2 \cdot HCl$ (percent): C, 64.09; H, 8.74; N, 4.67. Found (percent): C, 63.74; H, 9.04; N, 4.39.

Example 12

In a similar manner to Example 9, 3-isopropyl-6,6-dimethyl-8,9 - dimethoxy - 1,2,3,4,5,6 - hexahydro-3-benzazocine is obtained as an oily product from 6,6-dimethyl-8,9 - dimethoxy - 1,2,3,4,5,6 - hexahydro-3-benzazocine, iso-propyl bromide and sodium carbonate. Hydrochloride of the above-obtained product melts at 245° C. to 246° C.

*Elementary analysis.*—Calculated for $C_{18}H_{29}NO_2 \cdot HCl$ (percent): C, 65.93; H, 9.22; N, 4.27. Found (percent): C, 65.59; H, 9.52; N, 4.32.

Example 13

The following compounds are produced after a similar manner to the foregoing examples:

| Starting material | Product | Melting point and elementary analysis | Method |
|---|---|---|---|
| 6,6-dimethyl-8, 9-dimethoxy-1,2,3,4,5,6-hexahydro-3-benzazocine and cyclopropylcarboxylic chloride. | 3-cyclopropylcarbonyl-6,6-dimethyl-8,9-dimethoxy-1,2,3,4,5,6-hexahydro-3-benzazocine. | $C_{19}H_{27}NO_3$ Calc. C: 71.89 H: 8.58 N: 4.41 Found C: 71.72 H: 8.65 N: 4.53 | Exp. 10 (1). |
| 6,6-dimethyl-8,9-dimethoxy-1,2,3,4,5,6-hexahydro-3-benzazocine and benzoylchloride. | 3-benzoyl-6,6-dimethyl-8,9-dimethoxy-1,2,3,4,5,6-hexahydro-3-benzazocine. | $C_{22}H_{27}NO_3$ Calc. C: 74.76 H: 7.70 N: 3.96 Found C: 74.50 H: 7.83 N: 3.81 | Exp. 10 (1). |
| 3-cyclopropylcarbonyl-6,6-dimethyl-8,9-dimethoxy-1,2,3,4,5,6-hexahydro-3-benzazocine. | 3-cyclopropylmethyl-6,6-dimethyl-8,9-dimethoxy-1,2,3,4,5,6-hexahydro-3-benzazocine. | HCl·salt M.P.: 193–194° C. $C_{19}H_{29}NO_2 \cdot HCl$ Calc. C: 67.14 H: 8.90 N: 4.12 Found C: 67.34 H: 9.03 N: 4.12 | Exp. 10 (2). |
| 6,6-dimethyl-8,9-dimethoxy-1,2,3,4,5,6-hexahydro-3-benzazocine and dimethylallyl bromide. | 3-dimethylallyl-6,6-dimethyl-8,9-dimethoxy-1,2,3,4,5,6-hexahydro-3-benzazocine. | HCl·salt M.P.: 198–199° C. $C_{20}H_{31}NO_2$ HCl Calc. C: 67.87 H: 9.11 N: 3.96 Found C: 67.71 H: 9.07 N: 3.87 | Exp. 10 (1). |
| 3-benzoyl-6,6-dimethyl-8,9-dimethoxy-1,2,3,4,5,6-hexahydro-3-benzazocine. | 3-benzyl-6,6-dimethyl-8,9-dimethoxy-1,2,3,4,5,6-hexahydro-3-benzazocine. | HCl·salt M.P.: 209–210° C. $C_{22}H_{29}NO_2 \cdot HCl$ Calc. C: 70.89 H: 8.04 N: 3.73 Found C: 70.38 H: 8.20 N: 3.66 | Exp. 10 (2.) |
| 6,6-dimethyl-8,9-dimethoxy-1,2,3,4,5,6-hexahydro-3-benzazocine and benzyl chloride. | 3-benzyl-6,6-dimethyl-8,9-dimethoxy-1,2,3,4,5,6-hexahydro-3-benzazocine. | HCl·salt M.P.: 209–210° C. | Exp. 10 (1). |
| 6,6-dimethyl-8,9-dimethoxy-1,2,3,4,5,6-hexahydro-3-benzazocine and tetrahydrofurfuryl bromide. | 3-tetrahydrofurfuryl-6,6-dimethyl-8,9-dimethoxy-1,2,3,4,5,6-hexahydro-3-benzazocine. | HCl·salt M.P.: 221–222° C. $C_{20}H_{31}NO_3 \cdot HCl$ Calc. C: 64.93 H: 8.72 N: 3.79 Found C: 64.94 H: 8.68 N: 3.86 | Exp. 10 (1). |
| 6,6-dimethyl-8,9-dimethoxy-1,2,3,4,5,6-hexahydro-3-benzazocine and monochloroacetic acid monomethylamide. | 3-monomethylcarbamoylmethyl-6,6-dimethyl-8,9-dimethoxy-1,2,3,4,5,6-hexahydro-3-benzazocine. | M.P.: 92–93° C. $C_{18}H_{28}N_2O_3$ Calc. C: 67.47 H: 8.81 N: 8.74 Found C: 67.44 H: 8.85 N: 8.60 | Exp. 10 (1). |

TABLE—Continued

| Starting material | Product | Melting point and elementary analysis | Method |
|---|---|---|---|
| 6,6-dimethyl-8,9-dimethoxy-1,2,3,4,5,6-hexahydro-3-benzazocine and monochloroacetic acid monomethylamide. | 3-monomethylcarbamoylmethyl-6,6-dimethyl-8,9-dimethoxy-1,2,3,4,5,6-hexahydro-3-benzazocine. | HCl·salt M.P.: 212–213° C. $C_{18}H_{28}N_2O_3 \cdot HCl \frac{1}{2}H_2O$ Calc. C: 59.08 H: 8.26 N: 7.66 Found C: 58.94 H: 8.14 N: 7.61 | Exp. 10 (1). |
| 6,6-dimethyl-8,9-dimethoxy-1,2,3,4,5,6-hexahydro-3-benzazocine and dimethylaminoethyl chloride-hydrochloride. | 3-dimethylaminoethyl-6,6-dimethyl-8,9-dimethoxy-1,2,3,4,5,6-hexahydro-3-benzazocine. | HCl·salt M.P.: 245–247° C. $C_{19}H_{32}N_2O_2$'2HCl Calc. C: 58.01 H: 8.71 N: 7.12 Found C: 57.75 H: 8.93 N: 7.20 | Exp. 10 (1). |
| 6,6-dimethyl-8-methoxy-1,2,3,4,5,6-hexahydro-3-benzazocine and dimethylallyl bromide. | 3-dimethylallyl-6,6-dimethyl-8-methoxy-1,2,3,4,5,6-hexahydro-3-benzazocine. | HCl·salt M.P.: 170–172° C. $C_{19}H_{29}NO \cdot HCl$ Calc. C: 70.45 H: 9.33 N: 4.32 Found C: 70.38 H: 9.4) N: 4.29 | Exp. 10 (1). |
| 6,6-dimethyl-8,9-dimethoxy-1,2,3,4,5,6-hexahydro-3-benzazocine and ethyl bromide. | 3-ethyl-6,6-dimethyl-8,9-dimethoxy-1,2,3,4,5,6-hexahydro-3-benzazocine. | HCl·salt M.P.: 175–177° C. $C_{17}H_{27}NO_2 \cdot HCl$ Calc. C: 65.05 H: 8.99 N: 4.46 Found C: 65.11 H: 9.04 N: 4.29 | Exp. 10 (1). |

Example 14

One part of metallic lithium is gradually dissolved in 250 parts by volume of liquid ammonia under keeping at a temperature of −40° C. to −35° C. To the solution is dropwise added a solution of one part of 3-benzyl-6,6-dimethyl - 8,9 - dimethoxy - 1,2,3,4,5,6 - hexahydro-3-benzazocine in 15 parts by volume of dioxane. The resulting mixture is kept at −40° C. to −35° C. for 7 hours and then at room temperature over-night to evaporate the liquid ammonia.

The resulting reaction mixture is distilled to evaporate the solvent and dissolved in water, followed by the extraction with ether. The extract is dried over magnesium sulfate and concentrated. The concentrate is passed through a column packed with alumina and eluted with benzene, whereby 3 - benzyl - 6,6-dimethyl-8-methoxy-9-hydroxy-1,2,3,4,5,6-hexahydro - 3 - benzazocine is yielded as an oily product. Hydrochloride of this product is colorless crystal melting at 217° C. to 219° C.

*Elementary analysis.*—Calculated for $$C_{21}H_{27}NO_2 \cdot HCl \cdot H_2O$$

(percent): C, 66.39; H, 7.96; N, 3.69. Found (percent): C, 66.40; H, 7.96; N, 3.75.

Example 15

2.0 parts of 3 - benzyl - 6,6 - dimethyl-8,9-dimethoxy-1,2,3,4,5,6 - hexahydro - 3 - benzazocine is added to 20 parts by volume of 48% hydrobromic acid and the mixture is refluxed for one hour. The resulting reaction mixture is concentrated under reduced pressure to dryness. Upon the addition of water the residue dissolves. This solution is neutralized with an aqueous solution of sodium hydrogen carbonate, followed by the extraction with ether. The extract is dried over anhydrous potassium carbonate and concentrated to dryness. The residue is charged into a column packed with silica gel and the column is eluted with ethyl acetate. The eluate is concentrated to give 3-benzyl - 6,6 - dimethyl - 8,9 - dihydroxy-1,2,3,4,5,6-hexahydro - 3 - benzazocine as a wax-like product. This product shows a maximum IR absorption at 3200 cm.$^{-1}$ significant for OH group. There is observed a disappearance of absorption of hydrogen originated in the methoxy radical in the nuclear magnetic reasonance spectrum.

Similar to the above procedure, 3,6,6 - trimethyl-8,9-dihydroxy - 1,2,3,4,5,6 - hexahydro - 3 - benzazocine is produced from 3,6,6-trimethyl-8,9-dimethoxy-1,2,3,4,5,6-hexahydro - 3 - benzazocine. Melting point: 223° C. to 224° C. (as hydrogen bromide).

*Elementary analysis.*—Calculated for $$C_{14}H_{21}NO_2 \cdot HBr \cdot H_2O$$

(percent): C, 50.30; H, 7.24; N, 4.19. Found (percent): C, 50.43; H, 7.34; N, 4.16.

Similar to the above procedure, 3,6,6-trimethyl-8-hydroxy - 1,2,3,4,5,6 - hexahydro-3-benzazocine is produced from 3,6,6 - trimethyl - 8 - methoxy - 1,2,3,4,5,6 - hexahydro-3-benzazocine. Melting point: 241° C. to 242° C. (decompose, as hydrogen phosphate).

*Elementary analysis.*—Calculated for $$C_{14}H_{21}NO \cdot H_3PO_4$$

(percent): C, 52.99; H, 7.62; N, 4.41. Found (percent): C, 52.73; H, 7.88; N, 4.44.

Example 16

To Grignard's reagent prepared from 4.8 parts of metallic magnesium, 100 parts by volume of anhydrous ether and 28.4 parts of methyl iodide, is added dropwise over about one hour a solution of 29.6 parts of N-(3,4-dimethoxyphenethyl) - N - isopropyl - β - alanine methyl ester in 100 parts by volume of anhydrous ether. The mixture is refluxed for one hour and after cooling 120 parts by volume of 10% hydrochloric acid is added to the mixture to decompose the excess of the Grignard's reagent. This mixture is separated into ether layer and aqueous layer. The aqueous layer is made alkaline by the addition of an aqueous solution of sodium hydroxide, followed by the extraction with ether. The extract is washed with water, dried over anhydrous magnesium sulfate and concentrated to dryness, whereby 17.0 parts of oily yellowish product is given as the residue.

This oily product is subjected repeatedly to a silica gel column chromatography employing ethyl acetate as effluent, whereby 6.5 parts of 4-[N-isopropyl-N-(3,4- dimethoxyphenethyl)amino] - 2 - methyl - 2 - butanol is obtained.

*Elementary analysis.*—Calculated for $C_{18}H_{31}NO_3$ (percent): C, 69.86; H, 10.10; N, 4.53. Found (percent): C, 69.59; H, 9.98; N, 4.67.

To 60 parts of polyphosphoric acid is added 4.2 parts of 4 - [N - isopropyl - N - (3,4-dimethoxyphenethyl) amino]-2-methyl-2-butanol, and the mixture is heated at a temperature of 60° C. to 70° C. with stirring for one hour. To the mixture is added 400 parts by volume of water. This mixture is made alkaline by the addition of aqueous solution of sodium hydroxide, followed by the extraction with ether.

The extract is washed with water, dried over anhydrous potassium carbonate and concentrated to give 3.5 parts of a yellowish oily product. This product is subjected to a silica gel column chromatography to give 3.1 parts of a yellowish oily product. This product is converted into its hydrochloride by the use of ethanolic hydrochloric acid. The hydrochloride is recrystallized from a mixture of ethyl acetate and methanol to yield white crystals of 3 - isopropyl - 6,6 - dimethyl-8,9-dimethoxy-1,2,3,4,5,6-hexahydro-3-benzazocine hydrochloride melting at 245° C. to 246° C. (decomposition).

*Elementary analysis.*—Calculated for $C_{18}H_{29}NO_2 \cdot HCl$ (percent): C, 65.93; H, 9.22; N, 4.27. Found (percent): C, 65.59; H, 9.32; N, 4.32.

Example 17

To Grignard's reagent prepared from 4.9 parts of metallic magnesium, 150 parts by volume of anhydrous ether and 29.1 parts of methyl iodide, is added dropwise a solution of 30 parts of N-cyclopropylmethyl-N-(3,4-dimethoxyphenethyl)-β-alanine methyl ester in 30 parts by volume of anhydrous ether. The mixture is refluxed in a water bath for 2 hours. After cooling, a saturated ammonium chloride solution is added to the mixture. The ether layer is separated. The aqueous layer is extracted with ether. The ether layers are combined altogether and washed with water, dried over anhydrous potassium carbonate and concentrated to dryness, whereby 25.0 parts of a yellowish oily product of 4-[N-cyclopropylmethyl-N-(3,4 - dimethoxyphenethyl)amino] - 2-methyl-2-butanol is obtained.

To 200 parts of polyphosphoric acid is added 21.0 parts of N - cyclopropylmethyl - N-(3,4-dimethoxyphenethyl)amino-2-methyl-2-butanol, and the mixture is stirred at a temperature of 80° C. to 90° C. for 50 minutes. The resultant is poured into 1200 parts by volume of ice-water, whereby the excess of polyphosphoric acid is decomposed. To this mixture is added under cooling an aqueous solution of sodium hydroxide to be neutralized, followed by the extraction with ether. The extract is washed with water, dried over anhydrous potassium carbonate and concentrated to give 14.0 parts of a yellowish oily product of 3-cyclopropylmethyl-6,6-dimethyl-8,9-dimethoxy - 1,2,3,4,5,6 - hexahydro - 3 - benzazocine melting at 193° C. to 194° C. This product is subjected to a silica gel column chromatography to give a yellowish oily product. This product is converted into its hydrochloride by the use of ethanolic hydrochloric acid. The hydrochloride is recrystallized from a mixture of ethyl acetate and methanol to give colorless crystals of 3-cyclopropylmethyl-6,6 - dimethyl - 8,9 - dimethoxy - 1,2,3,4,5,6-hexahydro-3-benzazocine hydrochloride melting at 193° C. to 194° C.

*Elementary analysis.*—Calculated for $C_{19}H_{29}NO_2 \cdot HCl$ (percent): C, 67.14; H, 8.90; N, 4.12. Found (percent): C, 67.34; H, 9.03; N, 4.12.

Example 18

(1) A similar procedure to Example 17 is carried out by employing 16.8 parts of N-methyl-N-(3,4-dimethoxyphenethyl)amino-β-alanine methylester and Grignard's reagent prepared from 3.1 parts of metallic magnesium and 18.6 parts of methyliodide. This procedure gives 13.0 parts of 4 - [N - methyl - N - (3,4 - dimethoxyphenethyl) amino]-2-methyl-2-butanol as a yellowish oily product. The oily product is purified by silica gel column chromatography employing a mixture of ethyl acetate and methanol (1:1 by volume).

*Elementary analysis.*—Calculated for $C_{16}H_{27}NO_3$ (percent): C, 68.29; H, 9.67; N, 4.98. Found (percent): C, 68.51; H, 9.53; N, 5.09.

(2) A similar procedure to Example 17 is carried out by employing 60 parts of polyphosphoric acid and 7.6 parts of 4-[N-methyl-N-(3,4-dimethoxyphenethyl)amino]-2-methyl-2-butanol to give 5.8 parts of 3,6,6-trimethyl-8,9-dimethoxy-1,2,3,4,5,6-hexahydro-3-benzazocine as a yellowish oily product. The product is converted by a similar manner to Example 17 to give its hydrochloride melting at 215° C. to 216° C.

*Elementary analysis.*—Calculated for $C_{16}H_{25}NO_2.HCl$ (percent): C, 64.09; H, 8.74; N, 4.67. Found (percent): C, 63.82; H, 9.04; N, 4.49.

Example 19

(1) A similar procedure to Example 17 is carried out by employing, on one hand, Grignard's reagent prepared from 10.6 parts of metallic magnesium, 500 parts by volume of anhydrous ether and 62.5 parts of methyliodide, and on the other hand, a solution of 71.5 parts of N-benzyl-N-(3,4-dimethoxyphenethyl)-β-alanine methylester dissolved in 100 parts by volume of anhydrous ether. This procedure gives 60.2 parts of 4-[N-benzyl-N-(3,4-dimethoxyphenethyl)amino]-2-methyl-2-butanol as a yellowish oily product. The oily product per se is employed in the subsequent ring-closure reaction without further purification.

(2) A similar procedure to Example 17 is carried out by employing 400 parts of polyphosphoric acid and 46.7 parts of 4-[N-benzyl-N-(3,4-dimethoxyphenethyl)amino]-2-methyl-2-butanol to give 30.0 parts of 3-benzyl-6,6-dimethyl - 8,9 dimethoxy-1,2,3,4,5,6-hexahydro-3-benzazocine as a yellowish oily product. The product is converted into its hydrochloride of colorless crystals by a similar manner to Example 17. The crystals are recrystallized from a mixture of ethyl acetate and methanol to give crystals melting at 209° C. to 210° C.

*Elementary analysis.*—Calculated for $C_{22}H_{29}NO_2.HCl$ (percent): C, 70.38; H, 8.20; N, 3.66. Found (percent): C, 70.29; H, 8.04; N, 3.73.

Example 20

A similar procedure to Example 17 is carried out by employing methylmagnesium iodide and N-tetrahydrofurfuryl-N-(3,4 - dimethoxyphenethyl)-β-alanine methylester to give 4 - [N-tetrahydrofurfuryl-N-(3,4-dimethoxyphenethyl)amino]-2-methyl-2-butanol. This product is treated in a similar manner to Example 17 to give 3-tetrahydrofurfuryl-6,6-dimethyl-8,9 - dimethoxy-1,2,3,4,5,6-hexahydro-3-benzazocine as a yellowish oily product. The oily product is converted into its hydrochloride of colorless crystals melting at 221° C. to 222° C. in a similar manner to Example 17.

*Elementary analysis.*—Calculated for $C_{20}H_{21}NO_3.HCl$ (percent): C, 64.93; H, 8.72; N, 3.79. Found (percent): C, 64.98; H, 8.58; N, 3.96.

Example 21

A similar procedure to Example 17 is carried out by employing methylmagnesium iodide and N-methylcarbamoylmethyl-N-(3,4-dimethoxyphenethyl) - β - alanine methylester to give crude 4-[N-methylcarbamoylmethyl-N-(3,4 - dimethoxyphenethyl)amino]-2-methyl-2-butanol as a yellowish oily product. The oily product per se is, without purification, brought to a ring-closure reaction similar to that in Example 17 by employing 10 times (by weight) of polyphosphoric acid. This procedure gives 3-methylcarbamoylmethyl - 6,6 - dimethyl-8,9-dimethoxy-1,2,3,4,5,6-hexahydro-3-benzazocine as colorless crystals melting at 92° C. to 93° C.

*Elementary analysis.*—Calculated for $C_{18}H_{28}N_2O_3$ (percent): C, 67.47; H, 8.81; N, 8.74. Found (percent): C, 67.44; H, 8.84; N, 8.59.

Example 22

A similar procedure to Example 17 is carried out by employing methylmagnesium iodide and N-dimethylaminoethyl-N-(3,4 - dimethoxyphenethyl) - β - alanine methylester to give 4-[N-dimethylaminoethyl-N-(3,4-dimethoxyphenethyl)amino]-2-methyl-2-butanol as a crude product. The crude product per se is brought to a ring-closure reaction similar to that in Example 17 by employing 10 times by weight of polyphosphoric acid, whereby 3-dimethylaminoethyl-6,6-dimethyl - 8,9 - dimethoxy-1,2,3,4,5,6-hexahydro-3-benzazocine is given as a yellowish oily product. The oily product is converted into its hydrochloride in a similar manner to Example 17. The hydrochloride is recrystallized from a mixture of methyl acetate and methanol to give colorless crystals decomposing at 245° C. to 246° C.

Example 23

A similar procedure to Example 17 is carried out by employing methylmagnesium iodide and N-benzyl-N-(3-methoxy-4-hydroxyphenethyl)-β-alanine methylester to give 4-[N-benzyl-N-(3-dimethoxy - 4 - hydroxyphenethyl) amino]-2-methyl-2-butanol as a crude product. The crude product is brought to a ring-closure reaction similar to that in Example 17 employing 10 times by weight of polyphosphoric acid, whereby 3-benzyl-6,6-dimethyl-8-hydroxy-9-methoxy-1,2,3,4,5,6-hexahydro - 3 - benzazocine is given as an oily product. The oily product is converted into its hydrochloride of colorless crystals melting at 172° C. to 174° C. in a similar manner to Example 17.

*Elementary analysis.*—Calculated for $$C_{21}H_{27}NO_2 \cdot HCl \cdot C_2H_5OH$$

percent: C, 67.71; H, 8.40; N, 3.43. Found (percent): C, 67.81; H, 8.20; N, 3.50.

Example 24

To polyphosphoric acid which is prepared by heating a mixture of 75 parts of phosphorus pentoxide and 75 parts of phosphoric acid at 120° C. for 1 hour, is added dropwise with stirring under heating at 80° C. 18 parts of 4-[N-benzyl - N - (m-methoxyphenethyl)amine] - 2 - methylbutanol (2), followed by keeping at 80° C. for 50 minutes. The resulting reaction mixture is poured into 500 parts by volume of ice-water, followed by extraction with 200 parts by volume of ether. The aqueous layer is made alkaline by the addition of 50% aqueous solution of potassium hydroxide and extracted three times with 600 parts by volume of ether. The ether extract is dried over potassium carbonate and concentrated. The concentrate is charged into a column packed with silica gel, and eluated with a mixture of benzene and ethyl acetate. The eluate is concentrated to dryness. The concentrate is dissolved into 30 parts by volume of 10% alcoholic hydrochloric acid and the solution is concentrated to dryness. The concentrate is recrystallized from a mixture of ethanol and ethyl acetate to give 9.2 parts of 3-benzyl-6,6-dimethyl-9-methoxy-1,2,3,4,5,6-hexahydro-3-benzazocine hydrochloride as colorless crystals melting at 202° C. to 204° C.

*Elementary analysis.*—Calculated for $C_{21}H_{27}NO \cdot HCl$ (percent): C, 72.92; H, 8.16; N, 4.05. Found (percent): C, 72.90; H, 8.18; N, 4.14.

What is claimed is:

1. A member selected from the group consisting of a benzazocine derivative of the formula

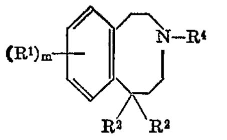

wherein $R^1$ represents a member selected from the group consisting of methoxy, hydroxy, acetyloxy and benzoyloxy with the proviso that two $R^1$ groups may together form an alkylenedioxy group of 2 to 3 carbon atoms, *m* is an integer of 1 to 3, each $R^2$ independently represents an alkyl group having up to 4 carbon atoms, and $R^4$ represents a member selected from the group consisting of hydrogen, alkyl of up to 6 carbon atoms, alkenyl of up to 6 carbon atoms, cycloalkyl alkyl of up to 6 carbon atoms, phenyl alkyl having up to 10 carbon atoms, an alkylamino-carbonylalkyl or mono- or dialkylaminoalkyl group wherein the alkyl moiety has up to 3 carbon atoms, alkylcarbonyl of up to 5 carbon atoms, cyclopropylcarbonyl, benzoyl, phenylacetyl, tosyl and tetrahydrofurfuryl, and pharmaceutically acceptable acid addition salts thereof.

2. A benzazocine derivative as claimed in claim 1, wherein $R^4$ is an alkyl of at most 6 carbon atoms.

3. A benzazocine derivative as claimed in claim 1, wherein $R^4$ is phenyl alkyl of at most 10 carbon atoms.

4. A benzazocine derivative as claimed in claim 1, wherein $R^4$ is a member selected from the group consisting of methyl and benzyl.

5. A compound according to claim 1, namely, 3-dimethylallyl - 6,6-dimethyl-8,9-dimethoxy-1,2,3,4,5,6-hexahydro-3-benzazocine.

6. A compound according to claim 1, namely, 3,6,6-trimethyl - 8,9 - dimethoxy - 1,2,3,4,5,6-hexahydro-3-benzazocine.

7. A compound according to claim 1, namely 3-cyclopropylmethyl - 6,6 - dimethyl - 8,9-dimethoxy-1,2,3,4,5,6-hexahydro-3-benzazocine.

8. A compound according to claim 1, namely, 3-benzyl-6,6 - dimethyl - 8,9 - dimethoxy - 1,2,3,4,5,6-hexahydro-3-benzazocine.

9. A compound according to claim 1, namely, 3-benzyl-9 - hydroxy - 6,6 - dimethyl-8-methoxy-1,2,3,4,5,6-hexahydro-3-benzazocine.

10. A compound according to claim 1, namely, 3-benzyl-6,6-dimethyl - 8 - hydroxy-9-methoxy-1,2,3,4,5,6-hexahydro-3-benzazocine.

11. A compound according to claim 1, namely, 3-benzyl - 6,6 - dimethyl-8,9-dihydroxy-1,2,3,4,5,6-hexahydro-3-benzazocine.

References Cited

UNITED STATES PATENTS

| | | | |
|---|---|---|---|
| 2,520,264 | 8/1950 | Walter | 260—239 |
| 3,093,632 | 6/1963 | Mull | 260—239 |

FOREIGN PATENTS

| | | | |
|---|---|---|---|
| 27,103 | 8/1964 | France | 260—239 |
| 1,473,840 | 2/1967 | France | 260—239 |

OTHER REFERENCES

Kobor, Chem. Abstracts, vol. 70, Abstract 28809 (1969).

ALTON D. ROLLINS, Primary Examiner

U.S. Cl. X.R.

260—340.3, 340.5, 347.4, 347.7, 471 A, 476 R, 479 R, 544 M, 546, 570.6, 570.8 R; 424—244